United States Patent
Hang et al.

(10) Patent No.: US 7,597,472 B2
(45) Date of Patent: Oct. 6, 2009

(54) TEMPERATURE SENSOR ASSEMBLY HAVING BRACKET

(75) Inventors: Tae Ho Hang, Suwon-si (KR); Deok Han Kim, Suwon-si (KR); Seong Hwan Hwang, Suwon-si (KR)

(73) Assignee: Pacific Controls Co., Ltd., Suwon-Si (KR)

( * ) Notice: Subject to any disclaimer, the term of this patent is extended or adjusted under 35 U.S.C. 154(b) by 0 days.

(21) Appl. No.: 12/011,373

(22) Filed: Jan. 25, 2008

(65) Prior Publication Data

US 2009/0190630 A1    Jul. 30, 2009

(51) Int. Cl.
*G01K 1/14* (2006.01)
(52) U.S. Cl. .................. 374/208; 374/147; 374/163; 24/458
(58) Field of Classification Search ............ 374/147, 374/148, 208, 163; 24/458
See application file for complete search history.

(56) References Cited

U.S. PATENT DOCUMENTS

| | | | | |
|---|---|---|---|---|
| 5,307,543 A | * | 5/1994 | Krillenberger | 24/543 |
| 5,707,151 A | * | 1/1998 | Parker et al. | 374/120 |
| 6,334,707 B1 | * | 1/2002 | Ku | 374/208 |
| 6,550,962 B1 | * | 4/2003 | Yang et al. | 374/147 |
| 6,814,486 B2 | * | 11/2004 | Sidoni | 374/208 |
| 2005/0025217 A1 | * | 2/2005 | Groeschner | 374/208 |

* cited by examiner

*Primary Examiner*—Gail Verbitsky
*Assistant Examiner*—Mirellys Jagan
(74) *Attorney, Agent, or Firm*—Ladas and Parry LLP (57) ABSTRACT

A temperature sensor assembly having a bracket is disclosed, which can improve the accuracy of temperature measurement and maintain the fixing state of the temperature sensor after the temperature sensor is mounted. The temperature sensor assembly is installed on a fluid pipe to measure a temperature of fluid in the pipe, and includes a housing composed of a temperature sensor mounted therein, a depressed part formed on an outer periphery of the housing, and a catch groove formed on one side of the depressed part; and a bracket for fixing the housing to the pipe, composed of a housing support part formed to surround an outer periphery of the depressed part and having a catch portion formed on a cut end portion of the housing support part and fixed to the catch groove of the housing, and a pipe support part having a bent portion extending upward from the housing support part with a predetermined inclination and being in contact with the pipe and a free end portion extending from the bent portion.

5 Claims, 6 Drawing Sheets

TEMPERATURE SENSOR ASSEMBLY HAVING BRACKET

BACKGROUND OF THE INVENTION

1. Field of the Invention

The present invention relates to a temperature sensor assembly, and more particularly, to a temperature sensor assembly having a bracket, whereby a housing, to which a temperature sensor for sensing the temperature of fluid flowing in a cylindrical member such as a fluid pipe is attached, can be installed on the cylindrical member.

2. Description of the Prior Art

Korean Patent Registration No. 10-0541473 (registered on Dec. 29, 2005) discloses "An apparatus for attaching/detaching a temperature sensor for a heat exchanger". This apparatus is to reduce a temperature deviation by sticking a temperature sensor for sensing the temperature of a heat exchanger fast to a sensor holder and to prevent a secession of a clip and the sensor, and includes a temperature sensor for sensing the temperature of a heat exchanger, a sensor holder, attached to a heat transfer pipe of the heat exchanger, for accommodating the temperature sensor, and an elastic clip, coupled to the sensor holder, for preventing the secession of the temperature sensor. The clip includes a handle piece provided at an upper end of the sensor holder, a sensor support piece for providing a specified elastic force from a center part of the sensor holder, a clip deviation prevention piece, having one end bent in a rear direction from a lower end part of the sensor holder, for preventing the clip from seceding from the sensor holder, and a sensor deviation prevention piece, projected in an upper direction from the lower end part of the sensor holder, for supporting a lower end part of the temperature sensor.

Generally, it is required that the temperature sensor assembly, which is installed on a fluid pipe and is used to measure the temperature of fluid, is easily mounted on a cylindrical member such as a pipe, and after the mounting, it maintains close adhesion between the temperature sensor and the pipe. In addition, during long-term use of the temperature sensor assembly, it should have tolerance against a crack and corrosion occurring due to a contact between the pipe and a fixing means such as a bracket and a clip.

The above-described prior art has the drawback in that since the close adhesion between the temperature sensor and an object to be measured cannot be maintained due to an intermediate member provided between the sensor and the object to be measured, the accuracy of the temperature measurement is degraded, and the fixing state of the temperature sensor only through the clip cannot be maintained due to an impact caused by the flowing of fluid through the pipe.

SUMMARY OF THE INVENTION

Accordingly, the present invention has been made to solve the above-mentioned problems occurring in the prior art while advantages achieved by the prior art are maintained intact.

One object of the present invention is to provide a temperature sensor assembly having a bracket, which can improve the accuracy of temperature measurement by making a temperature sensor in direct contact with a cylindrical member such as a pipe.

Another object of the present invention is to provide a temperature sensor assembly having a bracket, which can facilitate the mounting of a temperature sensor on a cylindrical member to be measured and can maintain the fixing state of the temperature sensor after the temperature sensor is mounted.

In order to accomplish these objects, in one aspect of the present invention, there is provided a temperature sensor assembly installed on a fluid pipe to measure a temperature of fluid in the pipe, which includes a housing composed of a temperature sensor mounted therein, a depressed part formed on an outer periphery of the housing, and a catch groove formed on one side of the depressed part; and a bracket for fixing the housing to the pipe, composed of a housing support part formed to surround an outer periphery of the depressed part and having a catch portion formed on a cut end portion of the housing support part and fixed to the catch groove of the housing, and a pipe support part having a bent portion extending upward from the housing support part with a predetermined inclination and being in contact with the pipe and a free end portion extending from the bent portion.

In another aspect of the present invention, there is provided a temperature sensor assembly installed on a fluid pipe to measure a temperature of fluid in the pipe, which includes a housing composed of a temperature sensor mounted in the housing, a pair of side walls formed on an outer periphery of the housing, being apart from and parallel to each other and having side wall holes, and a bottom wall coupled to the side walls and having a support projection formed thereon; a bracket composed of a first flat portion formed at one end of the bracket to be in contact with the bottom wall and having an opening penetrated by the support projection, a bent portion formed the other end of the bracket to be in contact with the pipe, and a free end portion extending from the bent portion; and a support rod composed of a base rod, having a cut upper portion and a lower portion supported by the support projection, for supporting a lower part of the first flat portion, and extension rods extending in directions opposite to each other on the same line from the cut upper portion of the base rod, and fixed to the side wall holes to support an upper portion of the first flat portion.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 1:
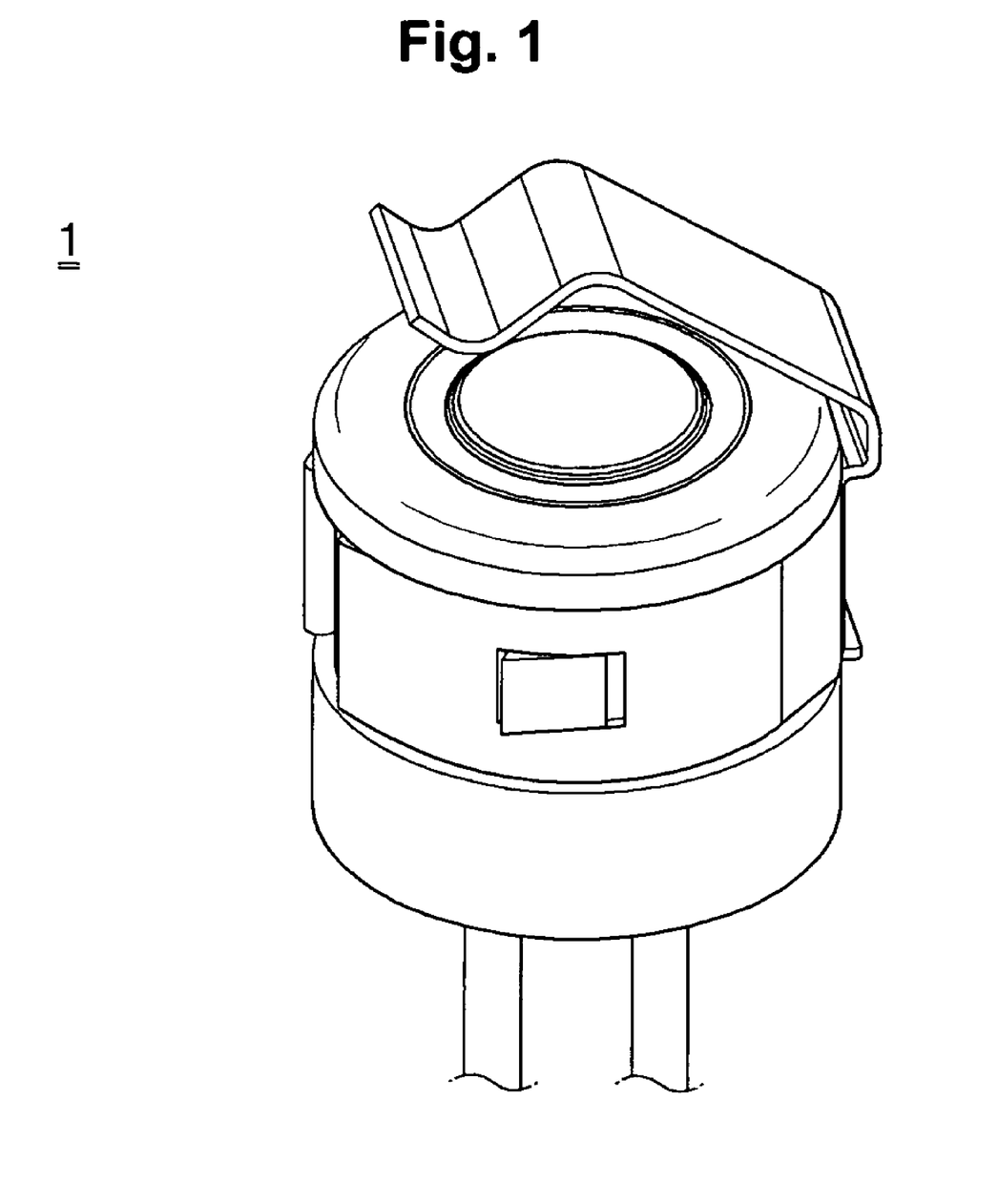
FIG. 1 is a perspective view of a temperature sensor assembly having a bracket according to an embodiment of the present invention.
Figure 2:
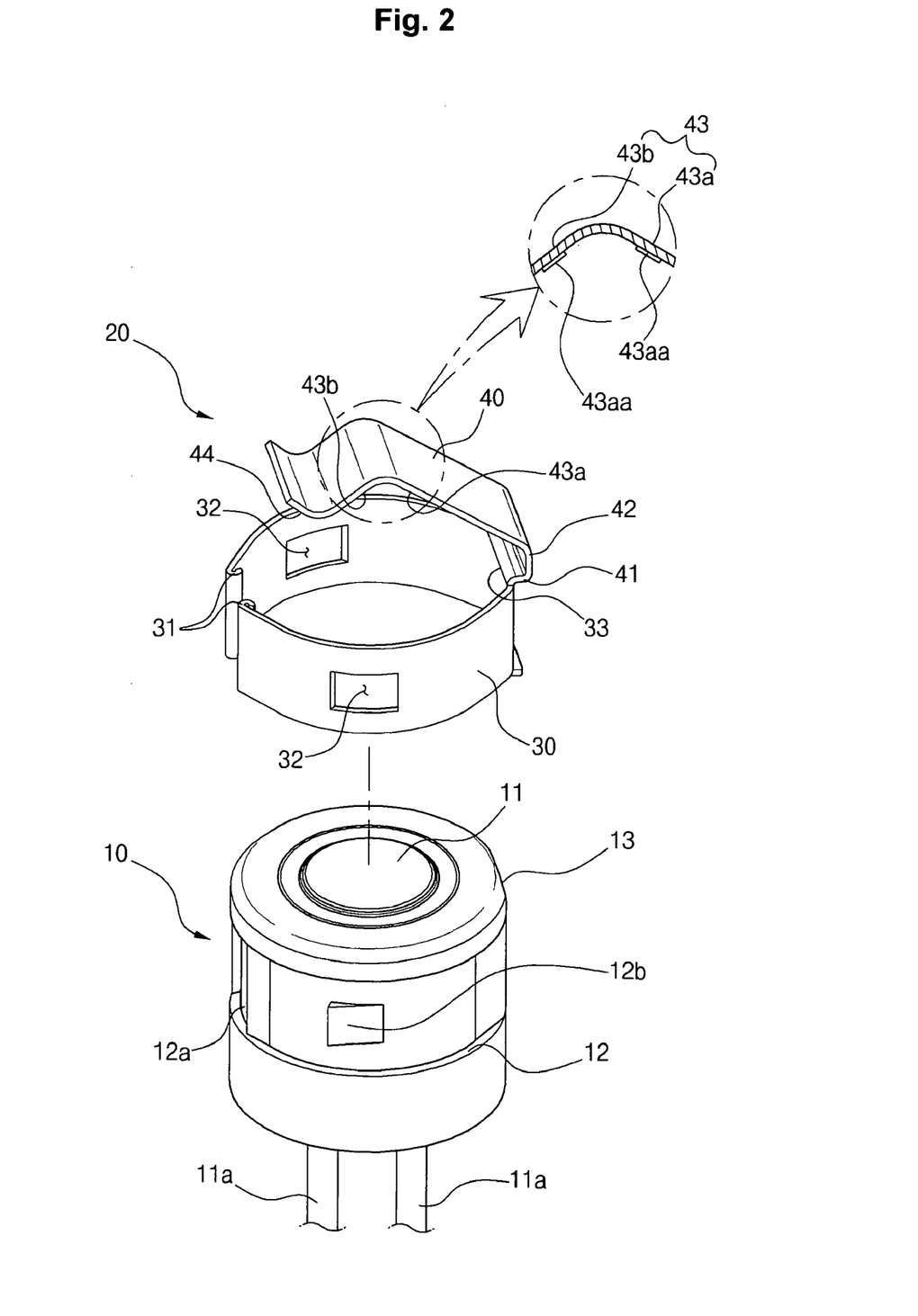
FIG. 2 is an exploded perspective view of the temperature sensor assembly illustrated in FIG. 1.
Figure 3:
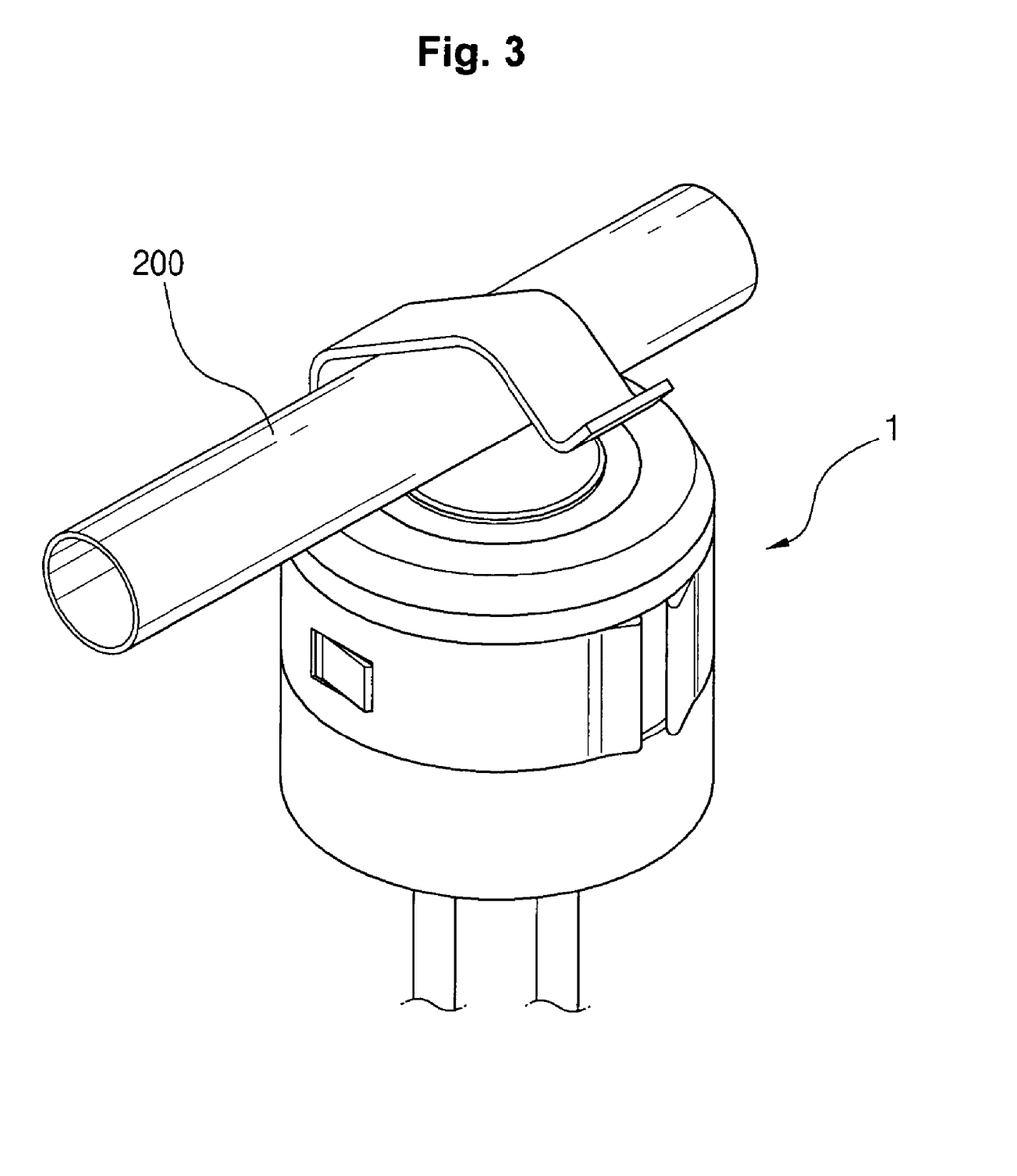
FIG. 3 is a view illustrating the temperature sensor assembly illustrated in FIG. 1 in a used state.

FIG. 1 is a perspective view of a temperature sensor assembly having a bracket according to an embodiment of the present invention. FIG. 2 is an exploded perspective view of the temperature sensor assembly illustrated in FIG. 1, and FIG. 3 is a view illustrating the temperature sensor assembly illustrated in FIG. 1 in a used state.

A temperature sensor assembly 1 having a bracket according to an embodiment of the present invention includes a housing 10 and a bracket 20.

AS illustrated in FIG. 2, the housing 10 preferably includes a temperature sensor 11 mounted in the center portion of a cylindrical main body, a flat surface 13 formed on one side of the main body as high as the main body, and a depressed part 12 formed to extend from one side to the other side of the flat surface 13.

The temperature sensor 11, which is well known in the art, is in the form of a switch that senses the temperature of fluid in the pipe. The temperature sensor 11 is typically in a closed state, but if the temperature sensed by the temperature sensor 11 exceeds a predetermined temperature level, it becomes in an open state. The operation of the temperature sensor 11 according to the present invention is not limited thereto, and the temperature sensor 11 may be in the form of a switch that is typically in an open state. It is preferable that the temperature sensor 11 is fitted by force into a groove (not illustrated) formed on the housing. Specifically, in the lower part of the temperature sensor 11, electric lead wires 11a are formed to be connected to a control part (not illustrated).

AS illustrated in FIG. 2, the flat surface 13 extends from an upper surface to a lower surface of the housing 10, and is in contact with a bracket flat surface 33 to be described later. The flat surface 13 corresponds to an angled part, i.e., an edge part, formed on the cylindrical housing 10, and serves to prevent a twist of the bracket 20 when the bracket 20 is coupled to the housing.

It is preferable that the depressed part 12 is formed on an outer periphery of the main body, but is not formed on the flat surface 13 as illustrated in FIG. 2. On one side of the depression part 12, i.e., in the position where the depression part 12 is in a line with the flat surface 13, a catch groove 12a for primarily supporting the bracket 20 to be described later is formed. This catch groove 12a, as illustrated in FIG. 2, is formed by forming jaws apart from the depression part 12.

In addition, it is preferable that between the catch groove 12a and the flat surface 13 of the depression part 12, a pair of hook projections 12b in the form of a right-angled triangle is formed in the same line, and serves to secondarily support the bracket after being fitted into hook holes 32.

As illustrated in FIG. 2, the bracket 20 is preferably provided with a housing support part 30 formed to surround an outer periphery of the housing 10 and fitted into the depressed part, and a pipe support part 40 extending from the housing support part 30 and being in close contact with and fixing the pipe 200.

The housing support part 30 has a shape corresponding to the housing 10, i.e., is in the form of a thin round plate, and is safely placed on the depressed part 12. One side of the housing support part 30, i.e., a portion of the housing support part 30 that is coupled to the catch groove 12a, is cut, and a catch portion 31 is formed at the cut end portion to be coupled to the catch groove 12a as illustrated in FIG. 2.

In addition, in positions that correspond to the hook projections 12b, the hook holes 32, which are preferably in the form of a rectangle, are formed to receive and support the hook projections. Further, on the housing support part 30, a bracket flat surface 33, which extends from the upper portion to the lower portion of the housing support part 30 and is in contact with the flat surface, is formed.

The pipe support part 40 is composed of a first flat portion 41 formed to extend from the housing support part 30 to an outside at a right angle with the housing support part 30, a second flat portion 42 formed to extend from the first flat portion 41 to an upside at a right angle with the first flat portion 41, a bent portion 43 which includes a third flat portion 43a formed to extend from the second flat portion 42 to an upside at an acute angle with the second flat portion 42 and having a length much longer than that of the first and second flat portions, and a fourth flat portion 43b formed to extend from the third flat portion 43a to a downside at a right angle with the third flat portion 43a, and has an embossed portion 43aa formed on the third flat portion 43a or the fourth flat portion 43b to be in contact with the pipe 200, and a free end portion 44 formed to extend from the fourth flat portion 43b to an upside at a right angle with the fourth flat portion 43b.

The embossed portion 43aa reduces heat transfer through the pipe support part 40 and suppresses a crack and corrosion of the pipe support part 40 by minimizing a contact surface between the pipe 200 and the pipe support part 40. Also, the pipe support part 40 that is in contact with the pipe 200 includes a pad, coating or plating material, and thus can suppress the corrosion or relative movement of the pipe support part 40.

Figure 4:
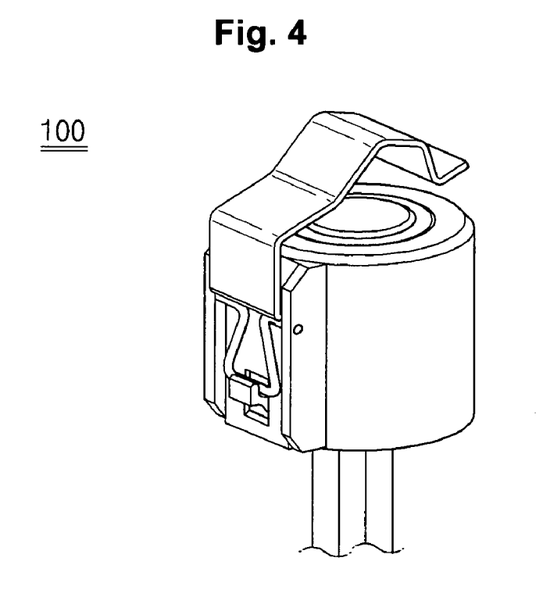
FIG. 4 is a perspective view of a temperature sensor assembly having a bracket according to another embodiment of the present invention.
Figure 5:
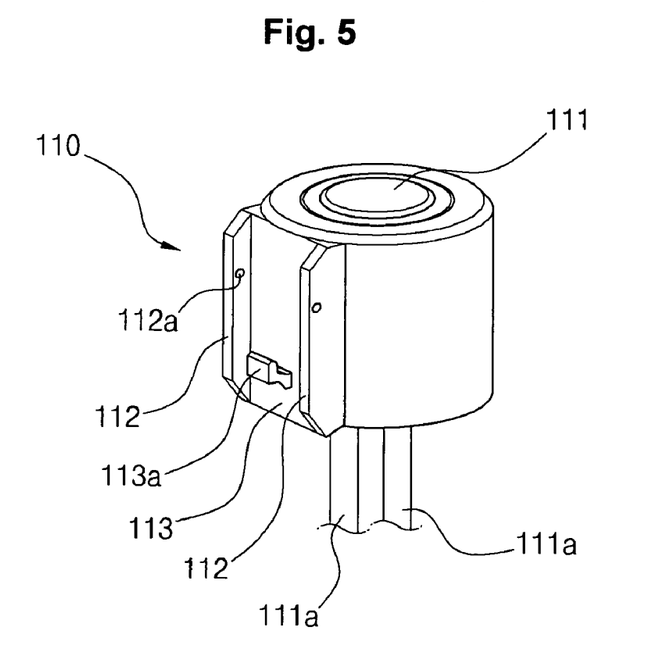
FIG. 5 is a perspective view of a housing adopted in the temperature sensor assembly illustrated in FIG. 4.
Figure 6:
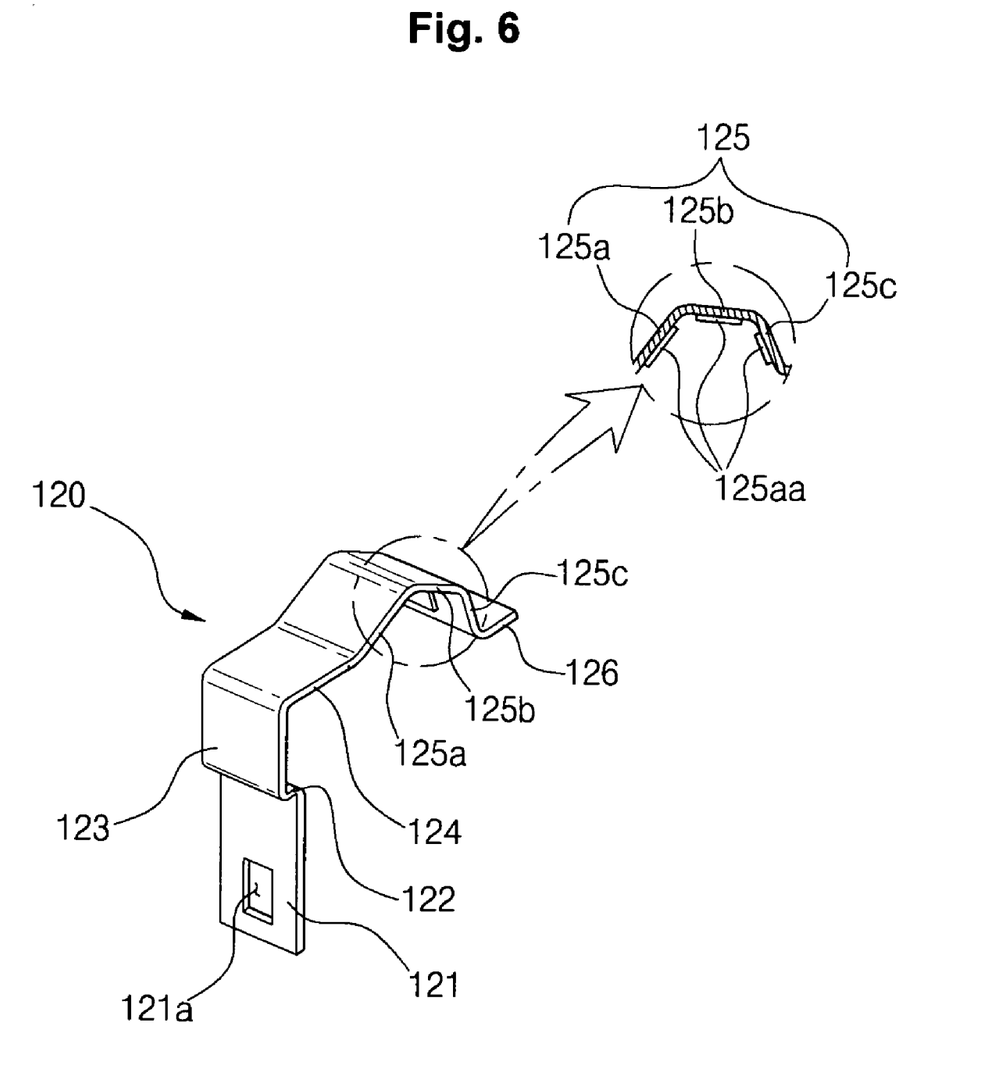
FIG. 6 is a perspective view of a bracket adopted in the temperature sensor assembly illustrated in FIG. 4.
Figure 7:
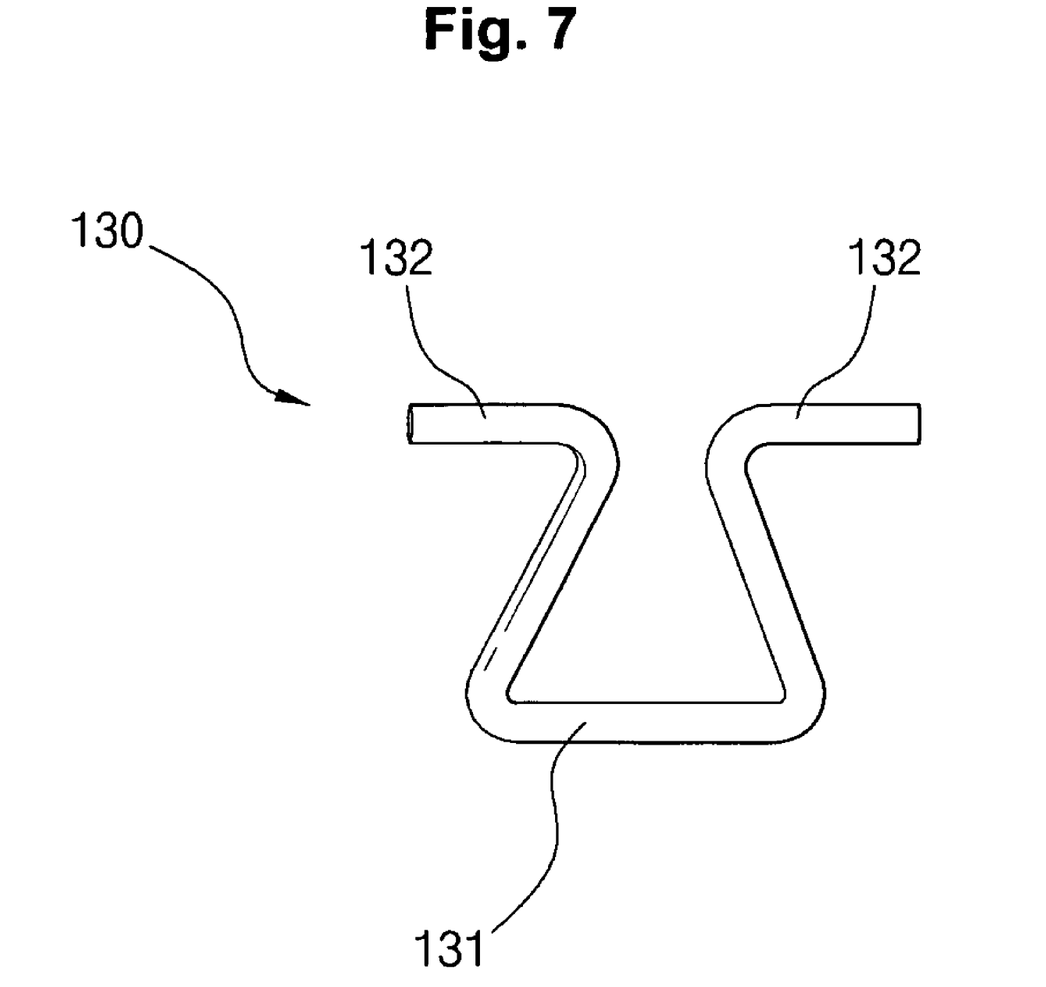
FIG. 7 is a perspective view of a support rod adopted in the temperature sensor assembly illustrated in FIG. 4.

FIG. 4 is a perspective view of a temperature sensor assembly having a bracket according to another embodiment of the present invention. FIG. 5 is a perspective view of a housing adopted in the temperature sensor assembly illustrated in FIG. 4, FIG. 6 is a perspective view of a bracket adopted in the temperature sensor assembly illustrated in FIG. 4, and FIG. 7 is a perspective view of a support rod adopted in the temperature sensor assembly illustrated in FIG. 4.

A temperature sensor assembly 100 having a bracket according to another embodiment of the present invention includes a housing 110, a bracket 120, and a support rod 130.

AS illustrated in FIG. 5, the housing 110 preferably includes a temperature sensor 111 mounted in a cylindrical main body, a pair of side walls 112 formed apart from and parallel to an outer periphery of the main body and having side wall holes 112a, and a bottom wall 113 coupled to the side walls 112 and having a support projection 113a formed thereon.

The temperature sensor 111, which is well known in the art, is in the form of a switch that senses the temperature of fluid in the pipe. The temperature sensor 111 is typically in a closed state, but if the temperature sensed by the temperature sensor 111 exceeds a predetermined temperature level, it becomes in an open state. The operation of the temperature sensor 111 according to the present invention is not limited thereto, and the temperature sensor 111 may be in the form of a switch that is typically in an open state. It is preferable that the temperature sensor 111 is fitted by force into a groove (not illustrated) formed on the housing. Specifically, in the lower part of the temperature sensor 111, electric lead wires 111a are formed to be connected to a control part (not illustrated).

As illustrated in FIG. 5, the side walls 112 are formed on an outer periphery of the housing 110 to extend apart from and parallel to each other. Preferably, the side walls 112 are formed to extend as high as the housing 110, and upper and lower ends of the side walls 112 are formed with a predetermined inclination.

Further, in order to secure the mobility according to the size of a cylindrical member such as a pipe 200, two or three side wall holes 112a may be formed on the side walls. Specifically, by adjusting the size of an opening 121a, which is penetrated by the support projection 113a, to secure the mobility in the support projection 113a, the coupling position of the support rod 130 to the side wall holes 112a can be selected according to the size of the pipe 200.

As illustrated in FIG. 5, it is preferable that the support projection 113a is formed in "L-"shape and has a width slightly larger than the diameter of a base rod 131 to be described later so as to accommodate the lower part of the base rod 131.

The bracket 120, as illustrated in FIG. 6, is composed of a first flat portion 121 formed to be in contact with the bottom surface 113 and having an opening 121a, a second flat portion 122 formed to extend from the first flat portion 121 to an outside, being bent at a right angle with the first flat portion 121, a third flat portion 123 formed to extend from the second flat portion 122 to an upside, being bent at a right angle with the second flat portion 122, a fourth flat portion 124 formed to extend from the third flat portion 123 to an upside, being bent at an acute angle with the third flat portion 123, a bent portion 125 which includes a fifth flat portion 125a formed to extend from the fourth flat portion 124 to an upside, being bent at an acute angle with the fourth flat portion 124, a sixth flat portion 125b formed to extend from the fifth flat portion 125a to a downside, being bent at an acute angle with the fifth flat portion 125a, and a seventh flat portion 125c formed to extend from the sixth flat portion 125b to a downside, being bent at an acute angle with the sixth flat portion 125b, and has an embossed portion 125aa formed on at least one of the fifth to seventh flat portions, and a free end portion 126 formed to extend from the seventh flat portion 125c to an upside at a right angle with the seventh flat portion 125c.

Since the embossed portion 125aa performs the same function as that described above, the detailed description thereof will be omitted.

The support rod 130 is preferably in the form of a triangle, and, as illustrated in FIG. 7, is composed of a base rod 131, having a cut upper portion and a lower portion supported by the support projection 113a, for supporting a lower portion of the first flat portion 121, and extension rods 132 extending in directions opposite to each other on the same line from the cut upper portion of the base rod 131, and fixed to the side wall holes 112a to support an upper portion of the first flat portion 121, and specifically a lower portion of the second flat portion 122.

As described above, according to the temperature sensor assembly having a bracket according to the embodiments of the present invention, the accuracy of temperature measurement can be improved by making a temperature sensor in direct contact with a cylindrical member such as a pipe.

Also, the temperature sensor can be easily mounted on a cylindrical member to be measured and the fixing state of the temperature sensor can be maintained after the temperature sensor is mounted.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A temperature sensor assembly having a bracket, installed on a fluid pipe to measure a temperature of fluid in the pipe, the temperature sensor assembly comprising:
    a housing composed of a temperature sensor mounted therein, a depressed part formed on an outer periphery of the housing, and a catch groove formed on one side of the depressed part; and
    a bracket for fixing the housing to the pipe, composed of a housing support part formed to surround an outer periphery of the depressed part and having a catch portion formed on a cut end portion of the housing support part and fixed to the catch groove of the housing; and a pipe support part having a bent portion extending upward from the housing support part with a predetermined inclination and being in contact with the pipe, and a free end portion extending from the bent portion.

2. The temperature sensor assembly of claim 1, wherein a flat surface, on which the depressed part is not formed, is formed in a line with the catch groove on the housing, and a bracket flat surface is formed in a position, which corresponds to the flat surface of the housing, on the bracket.

3. The temperature sensor assembly of claim 2, wherein a pair of hook projections, which are apart from each other, centering around the catch groove, are formed in the same line of the depressed part, and hook holes are formed in positions of the housing support part that correspond to the hook projections, so that the bracket is supported on the housing.

4. The temperature sensor assembly of claim 1, wherein an embossed portion is formed on the bent portion that is in contact with the pipe.

5. The temperature sensor assembly of claim 4, wherein the pipe support part comprises a first flat portion formed to extend from the housing support part to an outside at a right angle with the housing support part; a second flat portion formed to extend from the first flat portion to an upside at a right angle with the first flat portion; a bent portion which includes a third flat portion formed to extend from the second flat portion to an upside at an acute angle with the second flat portion and a fourth flat portion formed to extend from the third flat portion to a downside at a right angle with the third flat portion, and has an embossed portion; and a free end portion formed to extend from the fourth flat portion to an upside at a right angle with the fourth flat portion.

* * * * *

UNITED STATES PATENT AND TRADEMARK OFFICE
CERTIFICATE OF CORRECTION

PATENT NO. : 7,597,472 B2  Page 1 of 1
APPLICATION NO. : 12/011373
DATED : October 6, 2009
INVENTOR(S) : Tae Ho Hong et al.

It is certified that error appears in the above-identified patent and that said Letters Patent is hereby corrected as shown below:

On Title page Item (12) & Item (75) Inventors: "Hang" should read --Hong--.

Signed and Sealed this

Ninth Day of February, 2010

David J. Kappos
*Director of the United States Patent and Trademark Office*